(12) United States Patent
Eberhardt

(10) Patent No.: US 8,336,830 B2
(45) Date of Patent: Dec. 25, 2012

(54) RETRACTABLE AIRCRAFT WING TIP

(75) Inventor: David Scott Eberhardt, Seattle, WA (US)

(73) Assignee: The Boeing Company, Chicago, IL (US)

(*) Notice: Subject to any disclaimer, the term of this patent is extended or adjusted under 35 U.S.C. 154(b) by 1033 days.

(21) Appl. No.: 12/245,412

(22) Filed: Oct. 3, 2008

(65) Prior Publication Data
US 2010/0084516 A1 Apr. 8, 2010

(51) Int. Cl.
B64C 3/54 (2006.01)

(52) U.S. Cl. .................................. 244/218; 244/123.11

(58) Field of Classification Search .................. 244/46, 244/123.11, 130, 199.4, 201, 218, 219, 117 R, 244/100 A
See application file for complete search history.

(56) References Cited

U.S. PATENT DOCUMENTS

| 2,120,250 | A | * | 6/1938 | Houston | 244/219 |
| 3,106,373 | A | * | 10/1963 | Bain et al. | 244/117 R |
| 3,139,244 | A | * | 6/1964 | Bright | 244/12.3 |
| 3,463,420 | A | * | 8/1969 | Carter et al. | 244/46 |
| 3,481,569 | A | * | 12/1969 | Bell | 244/123.11 |
| 3,957,232 | A | * | 5/1976 | Sebrell | 244/123.11 |
| 4,102,519 | A | * | 7/1978 | Crosby, Jr. | 244/125 |
| 4,725,021 | A | * | 2/1988 | Priddy | 244/123.11 |
| 4,824,053 | A | * | 4/1989 | Sarh | 244/218 |
| 4,858,854 | A | * | 8/1989 | Jacobson | 244/123.11 |
| 5,681,010 | A | * | 10/1997 | Jensen | 244/49 |
| 6,015,115 | A | * | 1/2000 | Dorsett et al. | 244/219 |
| 6,082,667 | A | * | 7/2000 | Haggard | 244/35 R |
| 6,199,796 | B1 | * | 3/2001 | Reinhard et al. | 244/35 R |
| 6,347,769 | B1 | * | 2/2002 | To et al. | 244/219 |
| 6,622,974 | B1 | * | 9/2003 | Dockter et al. | 244/219 |
| 7,137,592 | B2 | * | 11/2006 | Barocela et al. | 244/29 |
| 7,185,851 | B2 | * | 3/2007 | Elam | 244/123.11 |
| 7,789,343 | B2 | * | 9/2010 | Sarh et al. | 244/46 |
| 7,832,690 | B1 | * | 11/2010 | Levine et al. | 244/218 |
| 7,866,610 | B2 | * | 1/2011 | Bousfield | 244/218 |
| 2002/0162917 | A1 | * | 11/2002 | Heller et al. | 244/199 |
| 2004/0069906 | A1 | * | 4/2004 | Dockter et al. | 244/218 |
| 2004/0069907 | A1 | * | 4/2004 | Dockter et al. | 244/218 |
| 2009/0166477 | A1 | * | 7/2009 | Bousfield | 244/218 |
| 2009/0206193 | A1 | * | 8/2009 | File | 244/13 |

OTHER PUBLICATIONS

Brown, G., et al., "Inflatable Structures for Deployable Wings," AIAA 2001-2068, AIAA Aerodynamic Decelerator Systems Technology Conference and Seminar, 16th, Boston, MA, May 21-24, 2001, Collection of Technical Papers (A01-29251 Jul. 2001).

(Continued)

Primary Examiner — Tien Dinh
Assistant Examiner — Medhat Badawi
(74) Attorney, Agent, or Firm — Hope Baldauff Hartman, LLC

(57) ABSTRACT

Apparatus and methods provide for the use of retractable aircraft wing tips to increase the wingspan of an aircraft to decrease drag and increase fuel efficiency. According to various embodiments, a flexible lifting envelope is attached to an outboard end of an aircraft wing. Upon receiving pressurized air, the flexible lifting envelope extends outward to a lift-producing configuration that extends the span of the aircraft wing to which it is attached. When deflated, the flexible lifting envelope retracts into a stowed configuration to decrease the wingspan of the aircraft to allow for parking at airport gates or to alleviate flight loads. Various implementations provide for a telescoping wing tip and for a rolled wing tip.

18 Claims, 8 Drawing Sheets

OTHER PUBLICATIONS

McLean, Doug, "Wingtip Devices: What They Do and How They Do It," 2005 Boeing Performance and Flight Operations Engineering Conference, Revised, Jan. 2007.

Whitcomb, Richard, "A Design Approach and Selected Wind-Tunnel Results at High Subsonic Speeds for Wing-Tip Mounted Winglets," NASA Technical Report D-8260, 197654742, 1996.

Inflatoplane, downloaded Oct. 3, 2008, from http://davidszondy.com/future/Flight/rubber_plane.htm.

Goodyear Inflatoplane, Wikipedia, downloaded Oct. 3, 2008, from http://en.wikipedia.org/wiki/Goodyear_Inflatoplane.

* cited by examiner

RETRACTABLE AIRCRAFT WING TIP

BACKGROUND

Improving the fuel efficiency of an aircraft is an increasingly important aircraft design consideration. One aerodynamic solution to increasing efficiency may be to reduce the induced drag associated with aircraft wings by increasing the aircraft wingspan. However, various other considerations limit the extent that typical wingspans may be increased. One of these considerations includes airport gate restrictions. Airport gates are typically coded according to specific aircraft wingspans. To increase the wingspan of an aircraft beyond a certain length may increase the aircraft's efficiency, but may alter the gate code assigned to the aircraft, potentially limiting the number and type of gates at which the aircraft may park or even preventing the aircraft from parking at existing airport gates without the costly undertaking of reconfiguring airports to accommodate the aircraft.

Another consideration when increasing the wingspan of an aircraft is that doing so increases the bending moment of the wing. The corresponding increased loads on the wing during flight require structural reinforcement of the wing. However, the structural weight increase that coincides with the required structural reinforcement generally offsets the aerodynamic improvements of the increased wingspan. As an alternative to increasing wingspans in order to improve aircraft efficiency, winglets are often added to the tips of aircraft wings. Winglets have the effect of increasing wingspan without actually increasing the span of the wings; however, they are not as effective as an equivalent direct span increase. Moreover, winglets are commonly rigid and require load alleviation and structural improvements in the wing to accommodate the wing additions, which undesirably increases the weight of the wing.

Adding raked wing tips to an aircraft wing increases aircraft efficiency, but because raked wing tips increase the span of the wings, their use does not alleviate the problem with moving the aircraft to a different gate code, or requiring expensive modifications to existing gates. Additionally, raked wing tips are rigid structures that, like the winglets discussed above, often require structural improvements to the wing that may offset much or all of the benefit from the raked wing tips. By increasing the span of the wings, raked wing tips increase bending moments in the wings that must be accommodated with further structural improvements that add weight to the wing.

It is with respect to these considerations and others that the disclosure made herein is presented.

SUMMARY

It should be appreciated that this Summary is provided to introduce a selection of concepts in a simplified form that are further described below in the Detailed Description. This Summary is not intended to be used to limit the scope of the claimed subject matter.

Apparatus and methods described herein provide for a retractable aircraft wing tip. The various embodiments described herein provide a solution to the efficiency problem outlined above by providing reconfigurable aircraft wing tips that offer the benefit of an increased wingspan in flight, while retracting to accommodate airport gate constraints while on the ground or to relieve excessive loads during flight. According to one aspect of the disclosure provided herein, a retractable aircraft wing tip includes a flexible lifting envelope that may be attached to the end of an aircraft wing. This lifting envelope may inflate from a stowed configuration to an extended configuration that produces lift when air is provided inside the lifting envelope. Similarly, the lifting envelope may deflate and retract to the stowed configuration when the internal air is released.

According to one implementation, the retractable aircraft wing tip may include a telescoping spar within the flexible lifting envelope that extends outward from the end of the aircraft wing when air is introduced into the lifting envelope. The spar provides structural support to offset the bending moment created by the lifting envelope during flight. According to another implementation, the retractable wing tip may include a flexible spar within a flexible lifting envelope that is biased in a rolled-up configuration. When air is introduced into the flexible lifting envelope, the flexible spar unrolls outward from the aircraft wing as the lifting envelope inflates. When the internal air is discharged, the flexible spar rolls the retractable wing tip back toward the aircraft wing to the stowed configuration.

According to another aspect, a method for modifying a wingspan of an aircraft during flight operations includes inflating two opposing flexible wing tips to increase the wingspan of the aircraft for flight and deflating the wing tips to decrease the wingspan of the aircraft for parking. During inflation, the wing tips deploy from wing tip cavities at opposing ends of the aircraft wing from a collapsed stowed configuration to an extended configuration that adds lift-producing capabilities to the aircraft wing. When deflating, the wing tips retract from the extended configuration to the collapsed stowed configuration into the wing tip cavities to decrease the aircraft wingspan.

The features, functions, and advantages that have been discussed can be achieved independently in various embodiments of the present disclosure or may be combined in yet other embodiments, further details of which can be seen with reference to the following description and drawings.

DETAILED DESCRIPTION

The following detailed description is directed to apparatus and methods for increasing and decreasing an aircraft wingspan to improve aircraft efficiency during flight without affecting airport gate parking or requiring significant structural wing modifications to compensate for increased wing loading created by the lengthened wingspan. As discussed briefly above, permanently increasing an aircraft wingspan may increase the efficiency of the aircraft, but may also adversely affect the types of airport gates that may be utilized when parking the aircraft.

Utilizing the concepts and technologies described herein, retractable aircraft wing tips may be inflated for use during flight to physically increase the wingspan of an aircraft. In order to satisfy airport gate constraints, the retractable aircraft wing tips may be deflated and stowed at or within the outboard ends of the wings to which they are attached. By utilizing relatively light weight materials for the retractable wing tips, as compared to the weight of materials used if the aircraft wings were permanently lengthened or if rigid winglets were installed, the structural modifications to the aircraft wings to account for the increased bending moments and weight associated with the retractable wing tips is minimized. In fact, should the stresses placed on the wings during flight exceed a predetermined threshold due to the bending moments of the retractable wing tips, the wing tips may be retracted in flight to eliminate the additional loads placed on the wings from the wing tips.

Figure 1:
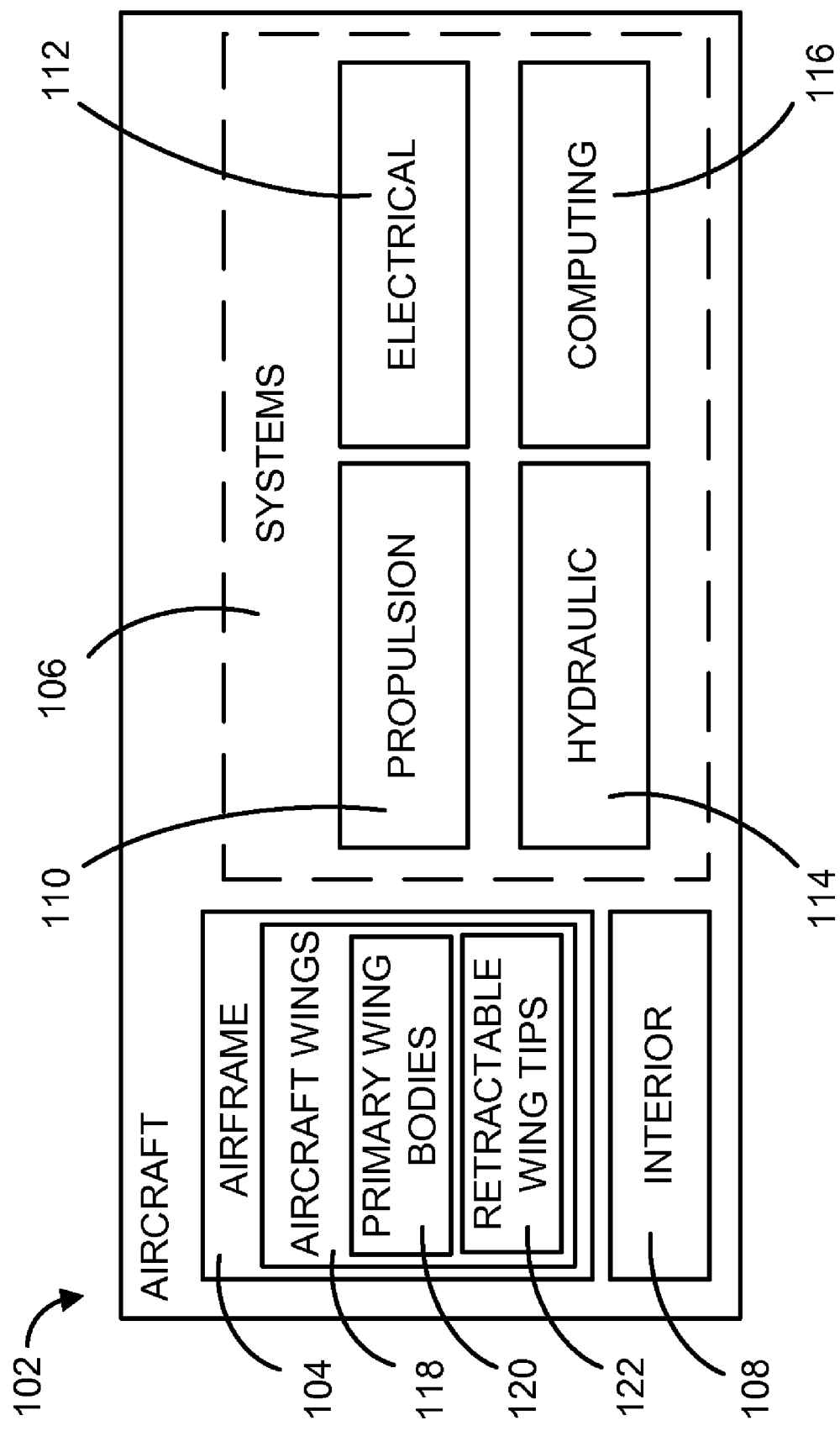
FIG. 1 is a block diagram of an aircraft according to various embodiments presented herein.

In the following detailed description, references are made to the accompanying drawings that form a part hereof, and which are shown by way of illustration, specific embodiments, or examples. Referring now to the drawings, in which like numerals represent like elements through the several figures, retractable aircraft wing tips according to the various embodiments will be described. FIG. 1 shows a simplified diagram of an aircraft 102 according to the embodiments described herein. The aircraft 102 may include an airframe 104, a plurality of systems 106, and an interior 108. The airframe 104 includes aircraft wings 118, which are made up of primary wing bodies 120 and retractable wing tips 122, as will be described in detail below. Examples of high-level systems 106 include, but are not limited to, a propulsion system 110, an electrical system 112, a hydraulic system 114, and a computing system 116. The computing system 116 may be functional to control any of the other aircraft systems 106 and will be described in further detail below with respect to FIG. 7.

Figure 2:
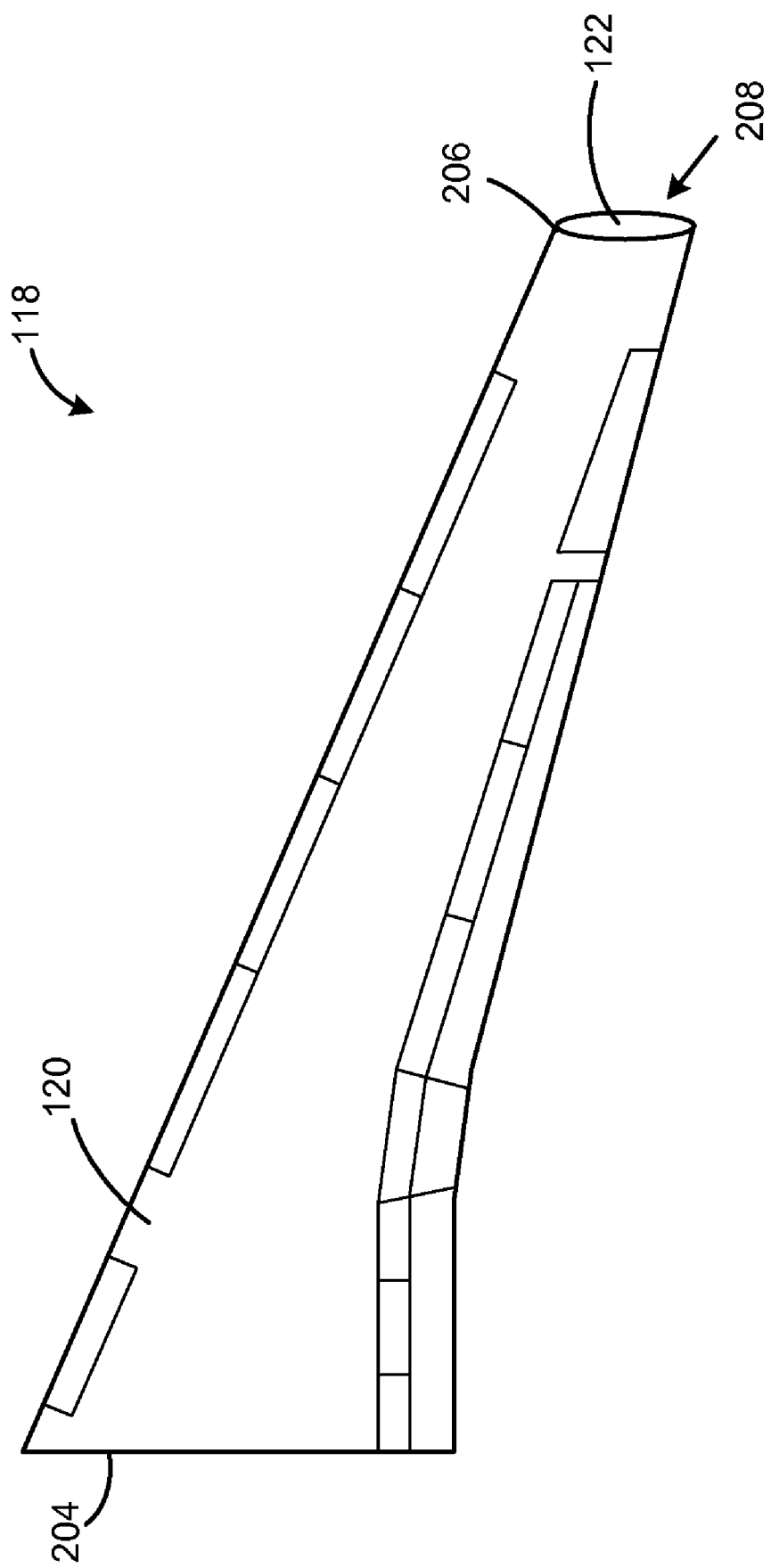
FIG. 2 is a top view of an aircraft wing showing a primary wing body with a retractable wing tip in a stowed configuration according to various embodiments presented herein.

FIG. 2 shows an aircraft wing 118 according to one embodiment. The aircraft wing includes a primary wing body 120 that extends from a wing root 204 to an outboard end 206 of the aircraft wing 118. It should be appreciated that the configuration of the aircraft wing 118 is not limited to that shown in FIG. 2. Rather, the aircraft wing 118 may include any shape, aspect ratio, span, sweep angle, and/or any other aerodynamic properties without departing from the scope of this disclosure. The aircraft wing 118 includes a retractable wing tip 122 that is shown in a stowed configuration 208. As will be described in further detail below, the stowed configuration 208 is achieved when the retractable wing tip 122 is deflated and retracted into a wing tip cavity of the primary wing body 120 in a manner described herein.

Figure 3:
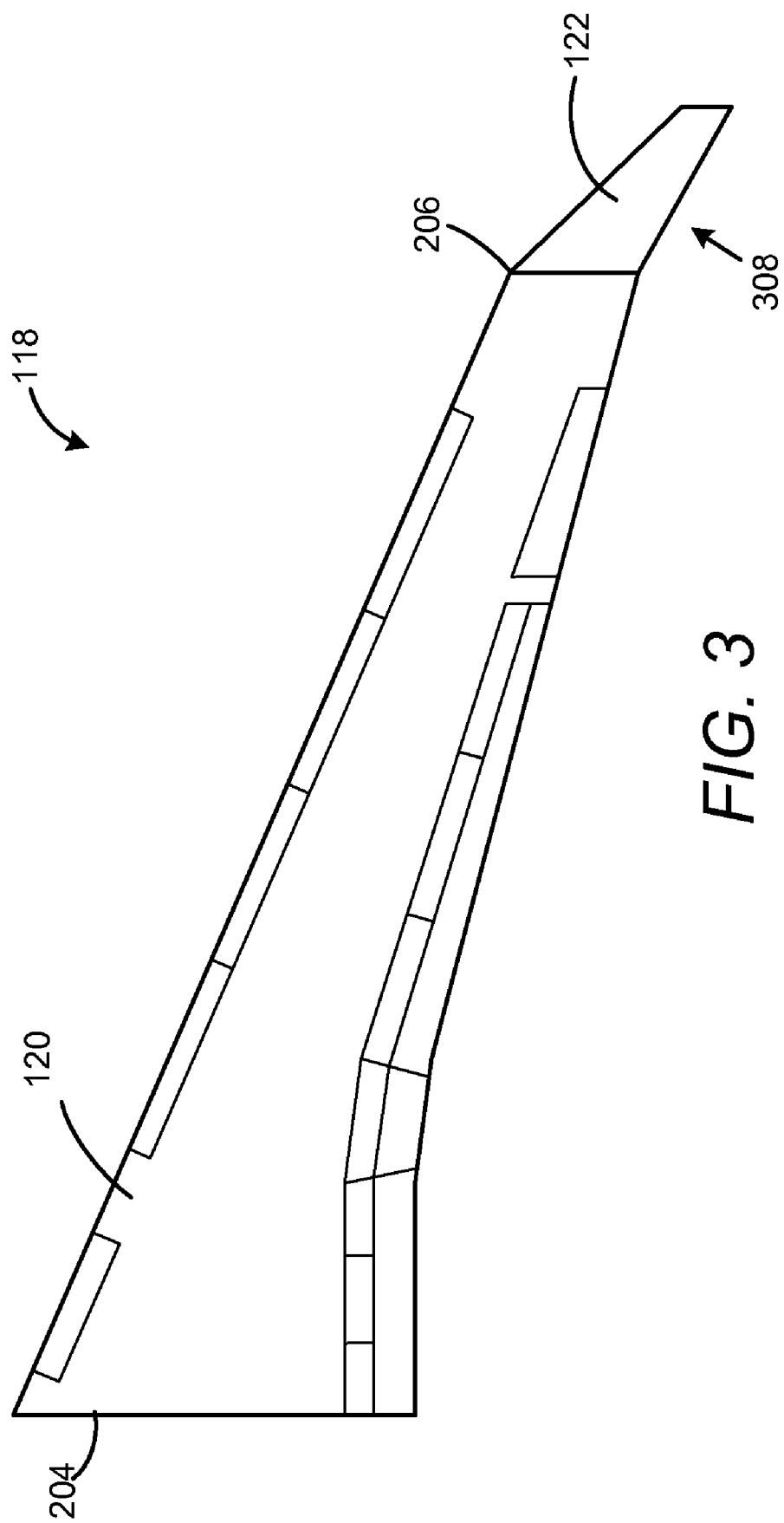
FIG. 3 is a top view of the aircraft wing of FIG. 2, showing a primary wing body with a retractable wing tip deployed in a lift-producing configuration according to various embodiments presented herein.

Turning to FIG. 3, the aircraft wing 118 of FIG. 2 is shown with the retractable wing tip 122 deployed in a lift-producing configuration 308. As illustrated, the retractable wing tip 122 deploys from the outboard end 206 of the primary wing body 120 so as to extend the wingspan of the aircraft 102. According to one embodiment, the retractable wing tip 122 is raked such that that retractable wing tip 122 is configured with a larger degree of sweep than the primary wing body 120. In doing so, the fuel economy of the aircraft 102 may be improved, as well as takeoff and climb performance by increasing the effective aspect ration of the aircraft wing 118 and decreasing the corresponding induced drag. However, it should be understood that the retractable wing tip 122 may be configured to have any desired shape, aspect ratio, span, sweep angle, and airfoil characteristics when deployed in the lift-producing configuration 308.

The disclosure provided herein will describe two illustrative embodiments for deploying a retractable wing tip 122. Although the concepts described herein are not limited to these two embodiments, the embodiments shown and described below with respect to FIGS. 4 and 5A, 5B demonstrate two effective means for modifying the wingspan of the aircraft 102. The embodiments described below utilize air pressure from an aircraft system 106 to inflate and deflate the retractable wing tip 122. The initial air pressure used to inflate the retractable wing tip 122 may be provided by the propulsion system 110, specifically from high-pressure engine compressor bleed air. Bleed air can be routed to the retractable wing tip 122 during aircraft taxi operations to inflate and deploy the retractable wing tip 122. Once inflated, only backpressure from the engine is required to maintain the proper inflation pressure. According to one implementation, backpressure is maintained through a one-way valve connected to the high-pressure compressor to maintain the proper inflation pressure over time. Alternatively, the inflation air pressure and/or the backpressure may be provided from an alternative aircraft system 106, such as a pump or other compressed air source.

Figure 4:
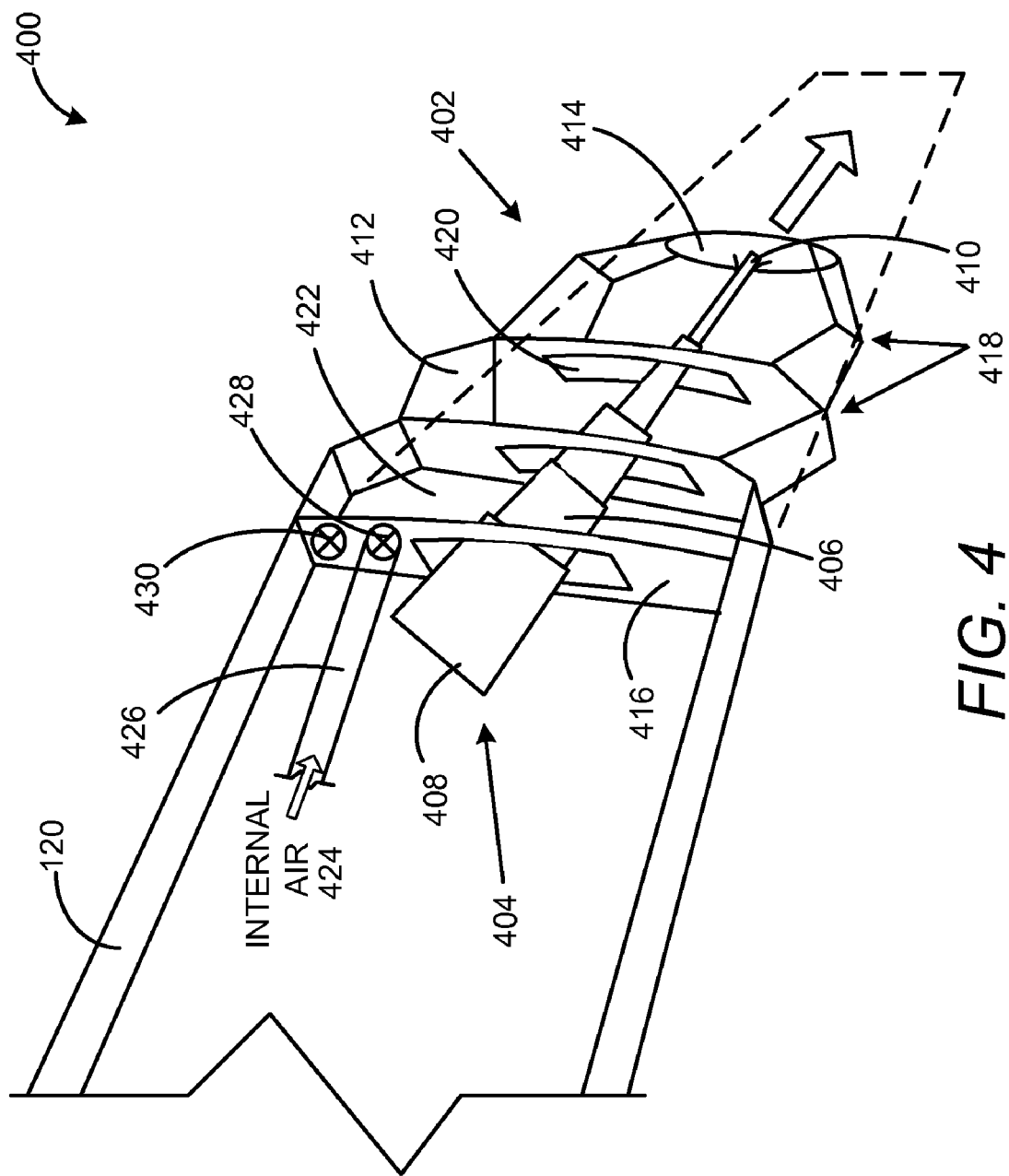
FIG. 4 is a perspective view of a telescoping wing tip assembly showing a telescoping wing tip spar and flexible lifting envelope in a partially deployed configuration according to various embodiments presented herein.

FIG. 4 shows a first embodiment for deploying the retractable wing tip 122. According to this embodiment, a telescoping wing tip assembly 400 includes a primary wing body 120 and a telescoping wing tip 402. The telescoping wing tip 402 includes a telescoping wing tip spar 404 that traverses the center of a flexible lifting envelope 412 and provides structural support for the telescoping wing tip 402. The telescoping wing tip spar 404 has a number of spar sections 406 that slidably engage one another to extend and retract the spar. When the retractable wing tip 122 is in the stowed configuration 208, the telescoping wing tip spar 404 is collapsed such that each spar section 406 nests within an adjacent spar section 406. When the retractable wing tip 122 is extended to the lift-producing configuration 308, the telescoping wing tip spar 404 is fully extended with a base end 408 of the telescoping wing tip spar 404 attached to the primary wing body 120 and an outer spar tip 410 of the telescoping wing tip spar 404 attached to an envelope tip 414 of the flexible lifting envelope 412.

Although FIG. 4 shows five spar sections 406, the telescoping wing tip spar 404 may be partitioned into any number of spar sections 406. The spar sections 406 may be manufactured from any rigid or semi-rigid material suitable for managing the stresses placed on the telescoping wing tip spar 404 by the lifting force during flight. Examples include but are not limited to composite materials, synthetic polymers, shape memory alloys, and shape memory polymers.

A secured base end 416 of the flexible lifting envelope 412 is fixed to the outboard end 206 of the primary wing body 120. At the opposite end of the flexible lifting envelope 412 is the envelope tip 414, which is secured to an outer spar tip 410 of the telescoping wing tip spar 404. The flexible lifting envelope 412 may also be attached to the telescoping wing tip spar 404 at any number of locations other than the connection of the envelope tip 414 to the outer spar tip 410. However, by attaching the envelope tip 414 to the outer spar tip 410, then as the internal air 424 is forced into the flexible lifting envelope 412 from the high-speed compressor of the aircraft engine or other air source, the telescoping wing tip spar 404 will telescopically expand along with the flexible lifting envelope 412 to provide structural support to the flexible lifting envelope 412 as lift is produced.

According to the embodiment shown in FIG. 4, the flexible lifting envelope 412 includes any number of accordion-style folds 418. These folds allow the flexible lifting envelope 412 to telescopically deploy outward to the lift-producing configuration 308 when inflated, and to telescopically compress inward into a wing tip cavity 422 when deflated. The wing tip cavity 422 may be a space within the outboard end 208 of the aircraft wing 118 in which the flexible lifting envelope 412 occupies when in the stowed configuration 208. The wing tip cavity 422 may be configured in any shape and size. Alternatively, the wing tip cavity 422 may be a virtual cavity in that it includes a space external to the outboard end 208 of the aircraft wing 118. In this embodiment, the retractable wing tip 122 compresses, folds, or rolls up against the outboard end 208 of the aircraft wing 118 into the virtual wing tip cavity 422.

The flexible lifting envelope 412 may include any number of ribs 420 for structural reinforcement, as well as to assist in maintaining the desired airfoil shape of the flexible lifting envelope 412 when deployed. These ribs 420 may be designed to be rigid or semi-rigid as compared to the flexible lifting envelope 412 and may include apertures (not shown) through which the telescoping wing tip spar 404 may extend. As with the spar, the ribs can be manufactured from materials including, but not limited to, composite materials, synthetic polymers, shape memory alloys and shape memory polymers, and may be reinforced with variable stiffness tethers with carbon nano-tubes, piezoelectric materials, braided high-tenacity fibers, or any combination thereof. The flexible lifting envelope 412 may be manufactured from an advanced synthetic fabric such as polyester, nylon, polyvinyl chloride, or any combination thereof, in the shape of the desired wing tip extension for the primary wing body 120. The flexible lifting envelope 412 may additionally include stiffness fiber reinforcement, such as shape memory polymers, variable stiffness tethers with carbon nano-tubes, piezoelectric materials, braided high-tenacity fibers, or any combination thereof, to prevent twisting and buckling while deployed and exposed to an ambient airflow.

It should be understood that the embodiments described herein are not limited to the structural components and configurations shown in the figures. For example, the telescoping wing tip assembly 400 shown in FIG. 4 may include any number of telescoping wing tip spars 404 and any number and types of ribs 420 or other reinforcement mechanisms. The precise materials to use in manufacturing the retractable wing tip 122 is a design choice according to the operating environment and conditions in which it will be used, the predicted stresses acting on the retractable wing tip 122, maintainability, and any number of other criteria. One method for creating the retractable wing tip 122 utilizing braided tubular beam structures with high-tenacity fibers to form a high-strength structure that can withstand high inflation pressures is disclosed in Brown, G, Haggard, R, and Norton, B, "Inflatable Structures for Deployable Wings," AIAA 2001-2068, pp. 19-26, which is herein incorporated by reference in its entirety.

As seen in FIG. 4, the telescoping wing tip 402 is inflated using internal air 424. As discussed above, the internal air 424 may originate from an aircraft engine as bleed air, or may be pumped in from another high-pressure air source. The internal air 424 is delivered to the telescoping wing tip assembly 400 through one or more high pressure hoses 426 and enters the telescoping wing tip 402 through an inflation valve 428. The inflation valve 428 is a one-way valve that allows the internal air 424 to enter the flexible lifting envelope 412, but prevents it from exiting via the same valve. Once the telescoping wing tip 402 is inflated, backpressure from the engine may be supplied to the inflation valve 428 for the duration of the flight to maintain the proper pressure within the flexible lifting envelope 412. The inflated pressure within the flexible lifting envelope 412 may depend upon the bending moment on the envelope tip 414, the desired stiffness of the flexible lifting envelope 412, and the stiffness of the materials used within the flexible lifting envelope 412.

It should be appreciated that the inflation valve 428 may additionally and/or alternatively be located within the base end 408 of the telescoping wing tip spar 404 such that the internal air 424 is supplied to the telescoping wing tip spar 404 to extend the spar and then to fill the interior of the flexible lifting envelope 412 via holes in the telescoping wing tip spar 404 (not shown). The retractable wing tip 122, according to both the telescoping wing tip 402 embodiment as well as the rolled wing tip 502 embodiment described below, may be inflated during taxi so that any additional load placed on the propulsion system 110 or other aircraft system 106 occurs prior to takeoff.

In order to deflate the telescoping wing tip 402, a relief valve 430 may be opened to rapidly discharge the high-pressure internal air 424 within the flexible lifting envelope 412. To further assist in the rapid deflation, a vacuum system may be utilized to rapidly extract the internal air 424 from the flexible lifting envelope 412. Alternatively, mechanical assistance, such as an actuator, may be utilized to mechanically retract the telescoping wing tip spar 404, which would then compress the flexible lifting envelope 412 and expel the internal air 424 from the telescoping wing tip 402. Another implementation includes a spring or other biasing device within the telescoping wing tip spar 404 to bias the spar in the stowed configuration 208. In the event of a sudden loss of air pressure, or even when the relief valve 430 is opened for deflation, the telescoping wing tip 402 would retract to the stowed configuration 208 with the aid of the biasing device.

The relief valve 430 may be utilized not only on the ground to deflate the retractable wing tips 122 for parking, but also during flight should the airplane begin to approach ultimate load limit margins with respect to the stress placed on the aircraft wings 118. When load limits are approached, the retractable wing tips 122 may be deflated using the relief valve 430 in order to decrease the bending moments experienced by the aircraft wings 118. It should be appreciated that the relief valve 430 may additionally be functional to provide protection against excessive air pressure within the flexible lifting envelope 412. The relief valve 430 may be designed to release small quantities of internal air 424 when the pressure within the flexible lifting envelope 412 exceeds a predetermined threshold pressure. The relief valve 430 may be placed at any location in which the internal air 424 within the flexible lifting envelope 412 may be expelled into the atmosphere.

Figure 5B:
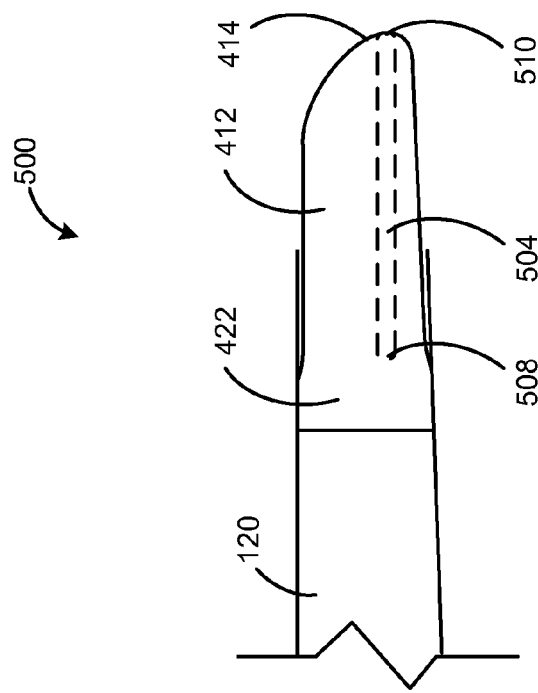
FIG. 5B is a cross-sectional view of the aircraft wing tip shown in FIG. 5A, illustrating the rolled wing tip in the lift-producing configuration according to various embodiments presented herein.
Figure 5A:
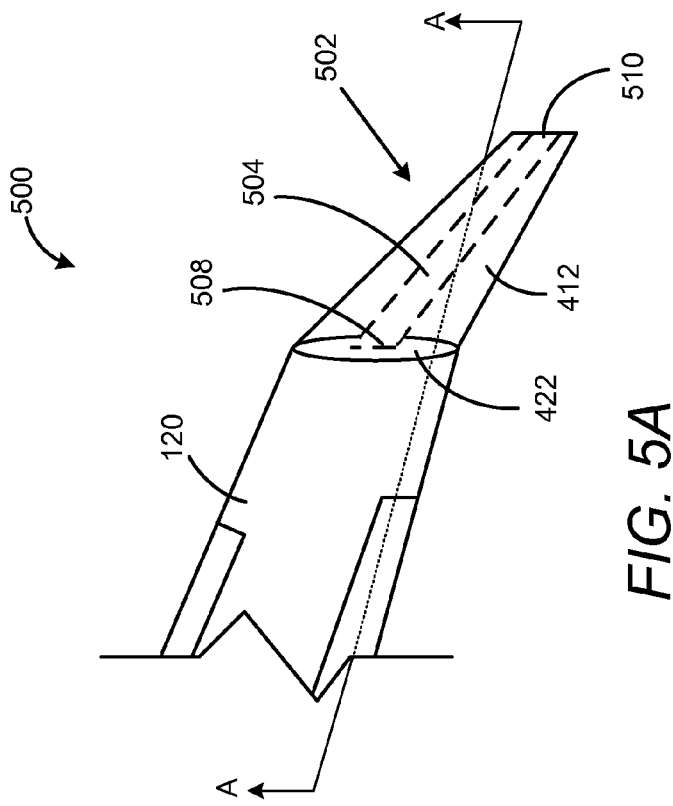
FIG. 5A is a top view of an aircraft wing showing a rolled wing tip having a flexible wing tip spar and a flexible lifting envelope in a lift-producing configuration according to various embodiments presented herein.

Turning now to FIG. 5A, a second embodiment for deploying and retracting a retractable wing tip 122 will be described. According to this embodiment, the retractable wing tip 122 is configured as a rolled wing tip assembly 500. The rolled wing tip assembly 500 includes a rolled wing tip 502 having a flexible spar 504 that spans a flexible lifting envelope 412. The flexible spar 504 is secured to the primary wing body 120 at a base end 508 of the flexible spar 504. A tip end 510 of the flexible spar 504 is attached to the envelope tip 414. FIG. 5A shows the rolled wing tip assembly 500 in the lift-producing configuration 308 in which it has been inflated utilizing engine bleed air or other high-pressure air and extends into position from the wing tip cavity 422. FIG. 5B shows a cross-sectional view along line A-A in FIG. 5A from the front of the aircraft wing 118 looking aft. In this view, it can be seen that the flexible spar 504 straightens and secures in a semi-rigid configuration when the rolled wing tip 502 is inflated.

Figure 5D:
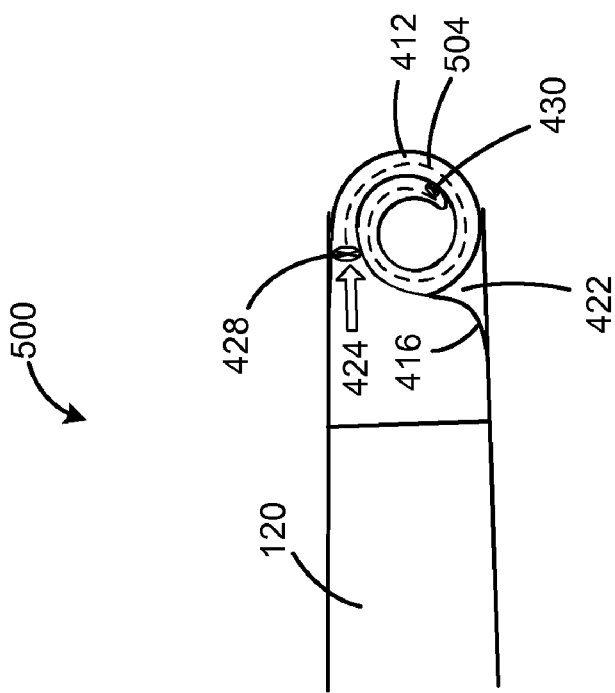
FIGS. 5C and 5D are cross-sectional views of the aircraft wing tip shown in FIG. 5A, illustrating two embodiments in which the flexible wing tip spar and flexible lifting envelope are rolled up in a stowed configuration.
Figure 5C:
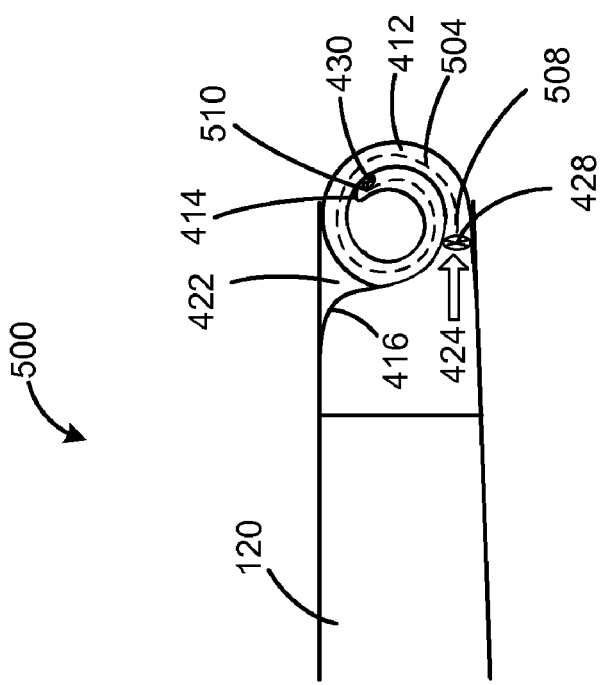

FIG. 5C shows the rolled wing tip assembly 500 in a stowed configuration 208. When in the stowed configuration 208, the rolled wing tip 502 is rolled inward into the wing tip cavity 422. The flexible spar 504 is spring loaded or otherwise biased in the rolled up configuration shown in FIG. 5C. When the internal air 424 is provided to the rolled wing tip 502 through the inflation valve 428, the high-pressure air forces the flexible spar 504 to unroll into the lift-producing configuration 308 shown in FIGS. 5A and 5B. When fully extended, the flexible spar 504 may secure into place to allow the flexible spar 504 to provide some structural support.

For example, the flexible spar 504 may include flexible metal spring bands that are bi-stable in that they have two resting configurations, one in the straightened position that accompanies the lift-producing configuration 308, and the other in the rolled position that accompanies the stowed configuration 208. When the internal air 424 is forced into the rolled wing tip 502, the flexible spar 504 is forced to unroll outward. When it straightens, it "snaps" into place in the lift-producing configuration 308. There is tension among the spring bands that cause the flexible spar 504 to snap back to the rolled configuration when enough upward force is applied to the flexible spar 504. Because it requires some measure of upward force before the flexible spar 504 snaps back to the stowed configuration 208, the flexible spar 504 may provide some structural support to the rolled wing tip assembly 500. In an embodiment shown in FIG. 5D, this structural support may be increased since the flexible spar 504 will be biased toward rolling downward, in an opposite direction from a lift vector created by the rolled wing tip assembly 500.

As seen in FIGS. 5B-5D, the secured base end 416 of the flexible lifting envelope 412 is fixed to the inside of the primary wing body 120 proximate to the wing tip cavity 422. The internal air 424 may be provided through the inflation valve 428 into the flexible lifting envelope 412, into the flexible spar 504, and/or into both the flexible lifting envelope 412 and the flexible spar 504. The relief valve 430 may be located anywhere within the rolled wing tip 502. However, by placing the relief valve 430 proximate to the envelope tip 414, the force of the discharged air may be adequate to displace the flexible spar 504 from the straightened position to sufficiently snap the flexible spar 504 back into the rolled position of the stowed configuration 208.

Figure 6:
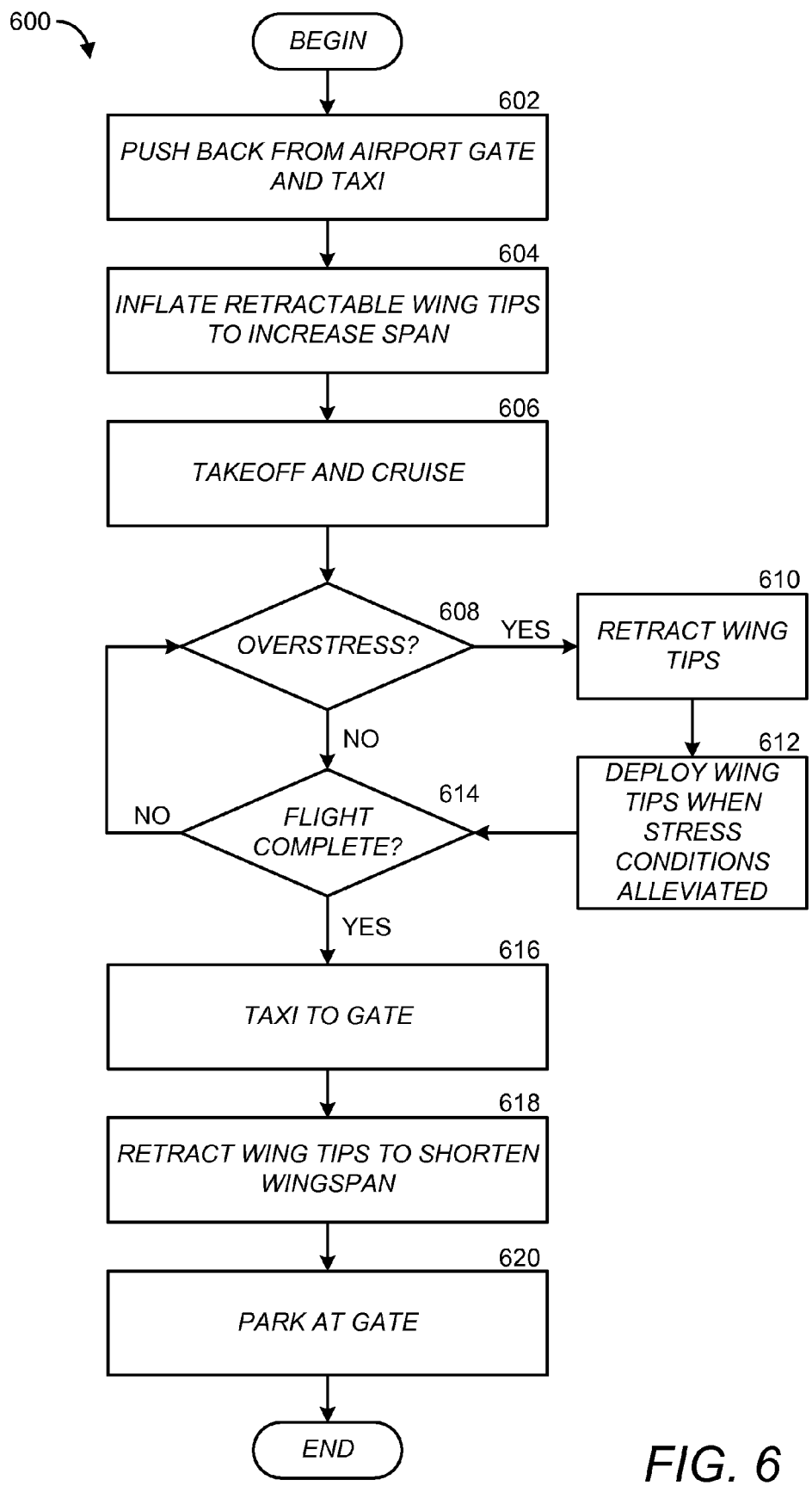
FIG. 6 is a flow diagram showing a method of dynamically modifying an aircraft wingspan during all phases of aircraft operations according to various embodiments presented herein.

Turning now to FIG. 6, an illustrative routine 600 for modifying an aircraft 102 wingspan during all phases of flight will now be described in detail. While some of the operations described below may be capable of being performed by a pilot during aircraft operations, others require the computing system 116, and all may conceivably be performed by the computer system 116. Accordingly, it should be appreciated that the logical operations described herein are implemented (1) as a sequence of computer implemented acts or program modules running on a computing system and/or (2) as interconnected machine logic circuits or circuit modules within the computing system. The computing system will be described below with respect to FIG. 7.

The implementation of the logical operations described herein is a matter of choice dependent on the performance and other requirements of the computing system. Accordingly, the logical operations described herein are referred to variously as states operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in a different order than those described herein.

The routine 600 begins at operation 602, where the aircraft exits the gate area and commences taxiing to the active runway. At operation 604, engine bleed air is routed to the inflation valves 428, inflating the retractable wing tips 122 and increasing the wingspan of the aircraft wings 118 prior to takeoff and cruise at operation 606. During the flight, at operation 608, the computing system 116 may monitor for flight conditions that indicate that the aircraft wings 118 are being subjected to excessive stress due to the increased bending moments created by the retractable wing tips 122. If overstress conditions are not found, then the routine continues to operation 614 and proceeds as described below.

However, if overstress conditions are found, then the routine 600 proceeds from operation 608 to operation 610, where the relief valves 430, as well as any additional retraction assisting mechanism as described above, are activated and the wing tips are retracted to the stowed configuration 208. At operation 612, when the overstress condition alleviates, the retractable wing tip 122 are inflated during flight to again increase the wingspan and increase aircraft efficiency. The routine continues from operation 612 to operation 614, where if the flight has not completed, the routine returns to operation 608, where the computing system continues to monitor for overstress conditions. If, however, at operation 614, it is determined that the aircraft 102 has landed, then the aircraft 102 proceeds to taxi to the applicable airport gate at operation 616. At operation 618, during taxi and prior to parking at the airport gate, the retractable wing tips 122 are deflated and retracted to the stowed configuration 208. At operation 620, the aircraft 118 is parked at the gate and the routine 600 ends.

Figure 7:
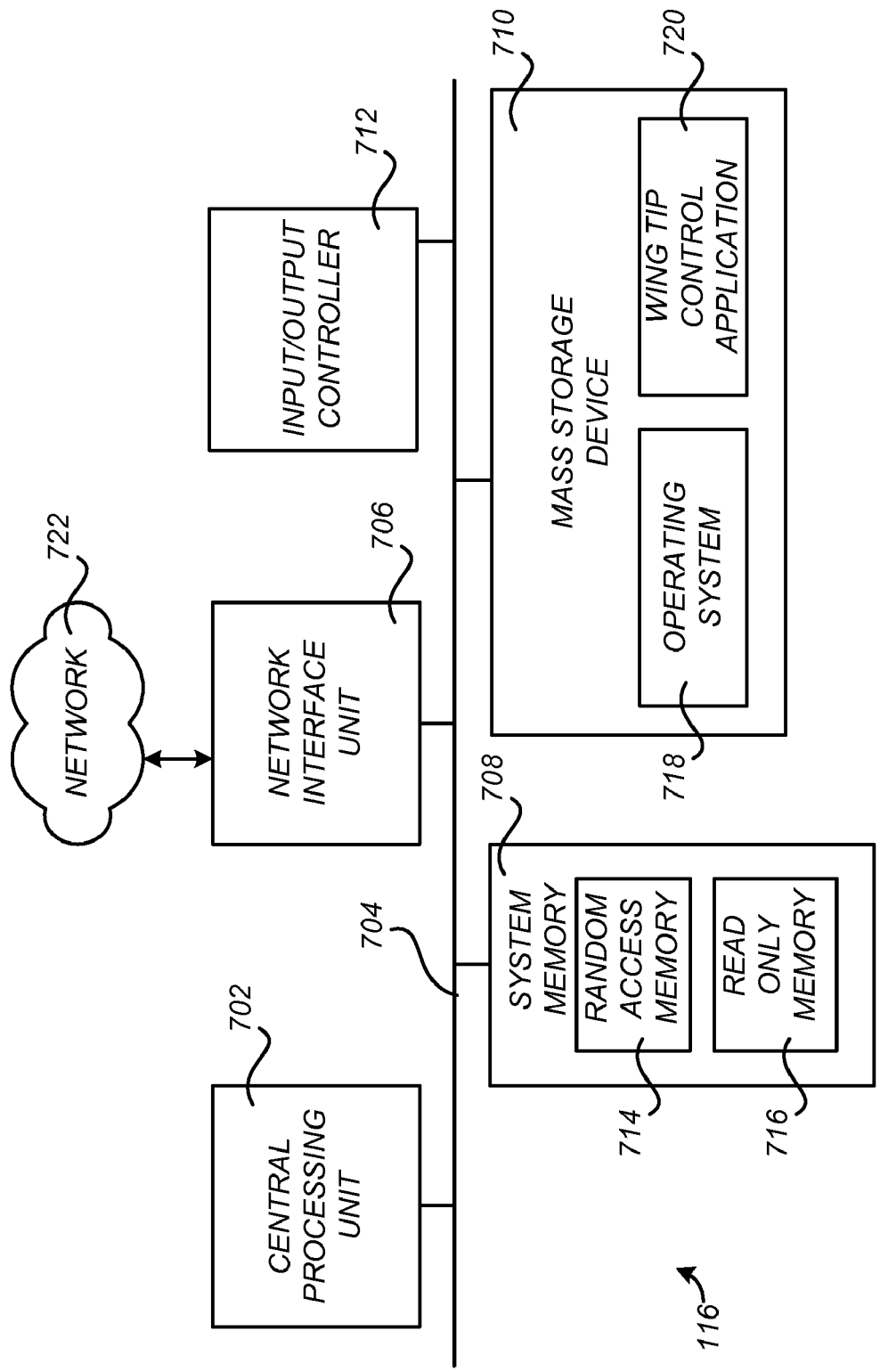
FIG. 7 is a computer architecture diagram showing an illustrative computer hardware and software architecture for a computing system capable of implementing aspects of the embodiments presented herein.

FIG. 7 shows an illustrative computer architecture for a computing system 116 capable of executing the software components for modifying an aircraft 118 wingspan in the manners presented above. The computer architecture shown in FIG. 7 illustrates a conventional desktop, laptop, or server computer and may be utilized to execute any aspects of the methods presented herein.

The computer architecture shown in FIG. 7 includes a central processing unit 702 (CPU), a system memory 708, including a random access memory 714 (RAM) and a read-only memory (ROM) 716, and a system bus 704 that couples the memory to the CPU 702. A basic input/output system containing the basic routines that help to transfer information between elements within the computer 700, such as during startup, is stored in the ROM 716. The computer 700 further includes a mass storage device 710 for storing an operating system 718, application programs, and other program modules, which are described in greater detail herein.

The mass storage device 710 is connected to the CPU 702 through a mass storage controller (not shown) connected to the bus 704. The mass storage device 710 and its associated computer-readable media provide non-volatile storage for the computer 700. Although the description of computer-readable media contained herein refers to a mass storage device, such as a hard disk or CD-ROM drive, it should be appreciated by those skilled in the art that computer-readable media can be any available computer storage media that can be accessed by the computer 700.

By way of example, and not limitation, computer-storage media may include volatile and non-volatile, removable and non-removable media implemented in any method or technology for storage of information such as computer-readable instructions, data structures, program modules or other data. For example, computer-storage media includes, but is not limited to, RAM, ROM, EPROM, EEPROM, flash memory or other solid state memory technology, CD-ROM, digital versatile disks (DVD), HD-DVD, BLU-RAY, or other optical storage, magnetic cassettes, magnetic tape, magnetic disk storage or other magnetic storage devices, or any other medium which can be used to store the desired information and which can be accessed by the computer 700.

According to various embodiments, the computer 700 may operate in a networked environment using logical connections to remote computers through a network such as the network 722. The computer 700 may connect to the network 722 through a network interface unit 706 connected to the bus 704. It should be appreciated that the network interface unit 706 may also be utilized to connect to other types of networks and remote computer systems. The computer 700 may also include an input/output controller 712 for receiving and processing input from a number of other devices, including a keyboard, mouse, or electronic stylus (not shown in FIG. 7). Similarly, an input/output controller may provide output to a display screen, a printer, or other type of output device (also not shown in FIG. 7).

As mentioned briefly above, a number of program modules and data files may be stored in the mass storage device 710 and RAM 714 of the computer 700, including an operating system 718 suitable for controlling the operation of a networked desktop, laptop, or server computer. The mass storage device 710 and RAM 714 may also store one or more program modules. In particular, the mass storage device 710 and the RAM 714 may store a wing tip control application that is operative to perform the operations described above. The mass storage device 710 and the RAM 714 may also store other types of program modules.

Based on the foregoing, it should be appreciated that technologies for modifying an aircraft 102 wingspan utilizing retractable wing tips 122 are provided herein. Utilizing the embodiments described herein, retractable wing tips 122 may be inflated to increase the span of aircraft wings 118 in order to reduce induced drag and increase fuel efficiency. With even a one percent reduction in drag, annual fuel savings in the order of hundreds of thousands of dollars may be realized. The embodiments described herein allow for the increase in fuel efficiency without requiring the modification of existing airport gates or the use of alternative and less common gates that can accommodate the largest of aircraft wingspans. Additionally, the concepts provided herein do not require a modification of existing aircraft wings 118 to support increased loads as the retractable wing tips 122 may be deflated as loads increase beyond an acceptable limit.

The subject matter described above is provided by way of illustration only and should not be construed as limiting. Various modifications and changes may be made to the subject matter described herein without following the example embodiments and applications illustrated and described, and without departing from the true spirit and scope of the present disclosure, which is set forth in the following claims.

What is claimed is:

1. A retractable aircraft wing tip, comprising:
a flexible lifting envelope configured for attachment to an outboard end of an aircraft wing, configured to extend from a stowed configuration to a lift-producing configuration that increases a span of the aircraft wing upon receipt of internal air, and configured to retract from the lift-producing configuration to the stowed configuration to decrease the span of the aircraft wing upon discharging the internal air; and
a release valve in communication with an interior of the flexible lifting envelope and with an atmosphere external to the flexible lifting envelope, the release valve operative to discharge the internal air from the flexible lifting envelope to the atmosphere to retract the flexible lifting envelope to the stowed configuration.

2. The retractable aircraft wing tip of claim 1, further comprising a telescoping wing tip spar attached to the flexible lifting envelope, the telescoping wing tip spar configured to extend outward with the flexible lifting envelope to the lift-producing configuration upon receipt of the internal air such that the telescoping wing tip spar provides structural support to the retractable aircraft wing tip while the flexible lifting envelope creates lift.

3. The retractable aircraft wing tip of claim 2, wherein the flexible lifting envelope comprises a plurality of accordion-style folds when configured in the stowed configuration.

4. The retractable aircraft wing tip of claim 1, further comprising
a flexible spar attached at an outboard end of the flexible spar to the flexible lifting envelope,
wherein the stowed configuration comprises a rolled-up configuration, and
wherein the flexible spar is configured to be biased in the rolled-up configuration such that being configured to extend from the stowed configuration to the lift-producing configuration that increases the span of the aircraft wing upon receipt of the internal air comprises being configured to unroll from the rolled configuration at the outboard end of the aircraft wing to an unrolled configuration that increases the span of the aircraft wing for lift creation upon receipt of the internal air.

5. The retractable aircraft wing tip of claim 4, wherein the flexible lifting envelope being configured to retract from the lift-producing configuration to the stowed configuration to decrease the span of the aircraft wing upon discharging the internal air comprises the flexible spar being configured to roll up toward the outboard end of the aircraft wing upon a release of the internal air such that the flexible lifting envelope rolls up to decrease the span of the aircraft wing.

6. The retractable aircraft wing tip of claim 1, wherein the internal air comprises engine bleed air routed from an aircraft engine during inflation of the flexible lifting envelope from the stowed configuration.

7. The retractable aircraft wing tip of claim 6, wherein the retractable aircraft wing tip is further configured to maintain the lift-producing configuration after the flexible lifting envelope is fully inflated to the lift-producing configuration utilizing backpressure without requiring the engine bleed air.

8. The retractable aircraft wing tip of claim 1, wherein the internal air comprises compressed air originating from an air pump.

9. The retractable aircraft wing tip of claim 1, further comprising a plurality of ribs disposed within the flexible lifting envelope to provide chord-wise structural support to the retractable aircraft wing tip.

10. The retractable aircraft wing tip of claim 1, wherein the flexible lifting envelope is configured to extend and to retract during any phase of aircraft operations.

11. A reconfigurable aircraft wing assembly, comprising:
   a primary wing body comprising a wing tip cavity at an outboard end of the primary wing body;
   a retractable aircraft wing tip configured for attachment to the outboard end of the primary wing body and operative to deploy from the wing tip cavity to a lift-producing configuration that increases a span of the primary wing body upon receipt of internal air and to retract from the lift-producing configuration to a stowed configuration within the wing tip cavity upon discharging the internal air; and
   a release valve in communication with an interior of the flexible lifting envelope and with an atmosphere external to the flexible lifting envelope, the release valve operative to discharge the internal air from the flexible lifting envelope to the atmosphere to retract the flexible lifting envelope to the stowed configuration.

12. The reconfigurable aircraft wing assembly of claim 11, wherein the retractable aircraft wing tip comprises:
   a flexible lifting envelope, the flexible lifting envelope comprising
      a closed wing tip end, and
      a secured base end opposite the closed wing tip end, the secured base end having an inflation valve for receiving the internal air; and
   a telescoping wing tip spar attached at a base end to the primary wing body and at a tip end to the closed wing tip end of the flexible lifting envelope, wherein the telescoping wing tip spar is configured to extend outward from the primary wing body to deploy the flexible lifting envelope to the lift-producing configuration upon receipt of the internal air such that the telescoping wing tip spar provides structural support to the retractable aircraft wing tip while the flexible lifting envelope creates lift.

13. The reconfigurable aircraft wing assembly of claim 11, wherein the retractable aircraft wing tip comprises:
   a flexible lifting envelope, the flexible lifting envelope comprising
      a closed wing tip end, and
      a secured base end opposite the closed wing tip end, the secured base end having an inflation valve for receiving the internal air; and
   a flexible spar attached at a base end to the primary wing body and at a tip end to the closed wing tip end of the flexible lifting envelope, wherein the flexible spar is configured to be biased in a rolled-up configuration such that being operative to deploy from the wing tip cavity to the lift-producing configuration that increases the span of the primary wing body upon receipt of the internal air comprises being configured to unroll from the rolled-up configuration within the wing tip cavity to an unrolled configuration that increases the span of the aircraft wing for lift creation upon receipt of the internal air, and such that being operative to retract from the lift-producing configuration to the stowed configuration within the wing tip cavity upon discharging the internal air comprises being configured to roll up into the wing tip cavity upon discharging the internal air.

14. The reconfigurable aircraft wing assembly of claim 11, wherein the internal air comprises engine bleed air routed from an aircraft engine during inflation of the retractable aircraft wing tip from the stowed configuration.

15. A method for modifying a wingspan of an aircraft wing during flight operations, comprising:
   inflating two opposing flexible wing tips from corresponding wing tip cavities at opposing ends of the aircraft wing such that each of the two opposing wing tips deploys from a collapsed stowed configuration to an extended lift-producing configuration to increase the wingspan of the aircraft for flight; and
   actuating a relief valve operative to release internal air from each flexible wing tip to deflate the two opposing flexible wing tips into the corresponding wing tip cavities such that each of the two opposing wing tips retracts from the extended lift-producing configuration to the collapsed stowed configuration to decrease the wingspan of the aircraft for parking.

16. The method of claim 15, wherein inflating the two opposing flexible wing tips comprises routing engine bleed air from at least one aircraft engine into each flexible wing tip.

17. The method of claim 15, wherein each flexible wing tip comprises a telescoping wing tip spar attached to an accordion-style flexible lifting envelope such that inflating the two opposing flexible wing tips comprises pushing air into each flexible wing tip to telescopically extend each flexible wing tip outward until the telescoping wing tip spar has fully extended and the flexible lifting envelope has expanded to a lift-producing shape.

18. The method of claim 15, wherein each flexible wing tip comprises a flexible spar attached to an inside envelope of a flexible lifting envelope and biased in a rolled-up configuration such that inflating the two opposing flexible wing tips comprises pushing air into each flexible wing tip to unroll each flexible wing tip outward until the flexible wing tip spar has fully unrolled and the flexible lifting envelope has expanded to a lift-producing shape.

* * * * *